(12) United States Patent
Wakahara et al.

(10) Patent No.: US 7,112,154 B2
(45) Date of Patent: Sep. 26, 2006

(54) SYSTEM AND METHOD FOR HYDRAULICALLY CONTROLLING AUTOMATIC TRANSMISSION

(75) Inventors: Tatsuo Wakahara, Kawasaki (JP); Yoshihisa Kodama, Yokohama (JP); Masahiro Yamamoto, Kanagawa (JP); Taichirou Yokoyama, Kanagawa (JP)

(73) Assignee: JATCO Ltd, Fuji (JP)

( * ) Notice: Subject to any disclaimer, the term of this patent is extended or adjusted under 35 U.S.C. 154(b) by 492 days.

(21) Appl. No.: 10/720,697

(22) Filed: Nov. 25, 2003

(65) Prior Publication Data

US 2004/0162183 A1 Aug. 19, 2004

(30) Foreign Application Priority Data

Dec. 2, 2002 (JP) ............................. 2002-350027

(51) Int. Cl.
*F16H 61/06* (2006.01)
*F16H 61/662* (2006.01)

(52) U.S. Cl. .............................. 474/28; 474/18; 477/45

(58) Field of Classification Search .................. 474/18, 474/28; 477/45–49, 37, 111, 169, 175; 701/51, 701/61
See application file for complete search history.

(56) References Cited

U.S. PATENT DOCUMENTS 4,557,706 A * 12/1985 Tanaka et al. ................. 474/28
4,782,934 A * 11/1988 Takano et al. ................. 477/39
5,908,367 A 6/1999 Tominaga et al.
6,077,187 A 6/2000 Suzuki et al.
6,086,513 A 7/2000 Tominaga
6,514,175 B1 * 2/2003 Taniguchi et al. .......... 477/156
2001/0044361 A1* 11/2001 Taniguchi et al. .......... 477/111
2003/0022742 A1* 1/2003 Fujimoto et al. ............. 474/18

FOREIGN PATENT DOCUMENTS

| JP | 64-41431 A | * | 2/1989 | .................. 477/37 |
| JP | 08-247242 A | * | 9/1996 | |
| JP | 10-2415 A | | 1/1998 | |
| JP | 2002-340158 A | * | 11/2002 | |

* cited by examiner

Primary Examiner—Marcus Charles
(74) Attorney, Agent, or Firm—Foley & Lardner LLP

(57) ABSTRACT

Hydraulic control system and method for an automatic transmission. The hydraulic control system includes a hydraulic pressure source, a flow rate control valve having a spool with an orifice and a drain hole, stroke position determining means, and pressure regulator means. The stroke position determining means determines that the spool is displaced from a large spool-stroke position where a communication area of the drain hole is not less than a first predetermined area, to a small spool-stroke position where the communication area is not more than a second predetermined area. The pressure regulator means regulates a hydraulic oil pressure downstream of the orifice and corrects the hydraulic oil pressure downstream of the orifice by adding a predetermined correction amount for a first predetermined time when the stroke position determining means determines that the spool is displaced from the large stroke position to the small stroke position.

18 Claims, 9 Drawing Sheets

SYSTEM AND METHOD FOR HYDRAULICALLY CONTROLLING AUTOMATIC TRANSMISSION

BACKGROUND OF THE INVENTION

The present invention relates to a system and method for hydraulically controlling an automatic transmission for vehicles.

An automatic transmission for vehicles performs a shifting operation using hydraulic oil pressure. The hydraulic pressure is controlled by a hydraulic control system which generally includes an oil pump driven by an engine of the vehicle. In the hydraulic control system, a hydraulic oil pressure produced by the oil pump is regulated to a predetermined pressure, namely, a line pressure. A hydraulic oil amount discharged by the oil pump is controlled by a flow rate control valve so as to keep substantially constant when the engine speed is not less than a preset speed.

One example of the flow rate control valve includes a spool having an orifice and a drain hole (drain port), and a housing having a drain passage connected to an automatic transmission. The spool is displaceable in the housing in response to a hydraulic pressure difference between an upstream side of the orifice and a downstream side thereof. The amount of hydraulic oil passing through the orifice is kept constant by regulating the hydraulic oil amount discharged from the drain hole and the drain passage which are overlapped with each other during displacement of the spool. The spool is prevented by a stop from displacing beyond a position where the overlap between the drain hole and the drain passage is maximized. Japanese Patent Application First Publication No. 10-2415 discloses such a flow rate control valve useable in the hydraulic control system for automatic transmissions.

SUMMARY OF THE INVENTION

In a case where the hydraulic oil amount flowing from the oil pump into the spool is decreased for a relatively short time without change in hydraulic pressure, the spool will be prevented from displacing to a proper position due to the fluid force generated in the drain hole. This results in failure in reducing the opening area of the drain hole. It was found that assuming that a hydraulic oil having the same amount and the same pressure flows into the flow rate control valve, the above defective phenomenon will occur during a transition range between a well-balanced large stroke state in which the spool moves in a large stroke to discharge a large amount of the hydraulic oil through the drain hole, and a well-balanced small stroke state. In such a transition range, a normal operation of the spool tends to be inhibited, for instance, due to friction caused at parts of the flow rate control valve. The occurrence of such a defective phenomenon results in increase in the hydraulic oil amount discharged from the drain hole, to thereby lack the hydraulic oil amount on the downstream side of the flow rate control valve. This leads to deterioration of an operating performance of the automatic transmission.

It is an object of the present invention to eliminate the above-described disadvantages and provide a hydraulic control system and method for an automatic transmission, which is capable of suppressing lack of a hydraulic oil amount on a downstream side of a flow rate control valve and avoiding deterioration of an operating performance of the automatic transmission.

In one aspect of the present invention, there is provided a hydraulic control system for an automatic transmission, comprising:

a hydraulic pressure source operative to discharge a hydraulic oil amount;

a flow rate control valve disposed on a discharge side of the hydraulic pressure source, the flow rate control valve including a displaceable spool formed with an orifice and a drain hole, the drain hole having a communication area which is fluidly communicated with an outside of the flow rate control valve and varied during displacement of the spool, the spool having a large stroke position where the communication area is not less than a first predetermined area, and a small stroke position where the communication area is not more than a second predetermined area, the flow rate control valve being operative to control a flow rate of the hydraulic oil amount passing through the orifice by regulating the hydraulic oil amount drained from the communication area depending on displacement of the spool;

stroke position determining means for determining that the spool is displaced from the large stroke position to the small stroke position; and pressure regulator means for regulating a hydraulic oil pressure downstream of the orifice, the pressure regulator means correcting the hydraulic oil pressure downstream of the orifice by adding a predetermined correction amount of hydraulic pressure for a first predetermined time when the stroke position determining means determines that the spool is displaced from the large stroke position to the small stroke position.

In another aspect of the invention, there is provided a method for hydraulically controlling an automatic transmission supplied with a hydraulic oil amount discharged by a hydraulic pressure source driven by a driving source, the hydraulic oil amount discharged being controlled by a flow rate control valve including a displaceable spool with an orifice, the method comprising:

determining whether a driving source speed is not less than a first speed;

determining whether the driving source speed is not more than a second speed;

determining whether a first predetermined time has elapsed when it is determined that the driving source speed is less than the first speed and that the driving source speed is not more than the second speed; and correcting a hydraulic oil pressure downstream of the orifice of the flow rate control valve by adding a predetermined correction amount of hydraulic pressure when it is determined that the first predetermined time has not elapsed.

DETAILED DESCRIPTION OF THE INVENTION

Figure 1:
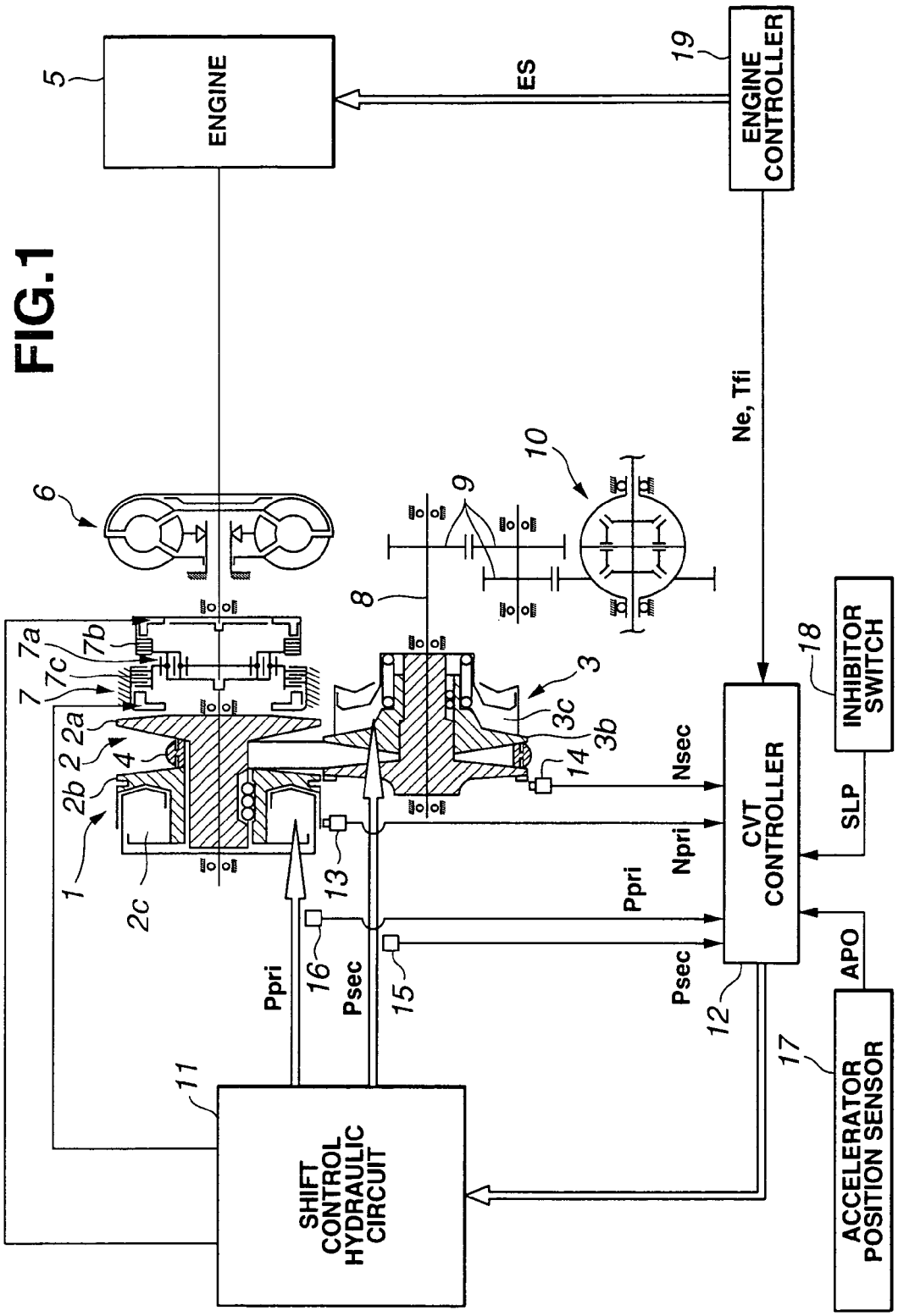
FIG. 1 is a schematic diagram illustrating a control system of a V belt-drive continuously variable transmission (CVT), to which a hydraulic control system according to the present invention is applicable.

Referring to FIG. 1, there is shown an automatic transmission to which a hydraulic control system according to a first embodiment of the present invention is applicable. The automatic transmission shown in FIG. 1 is a V belt-drive continuously variable transmission, hereinafter referred to as CVT, 1. As illustrated in FIG. 1, CVT 1 includes primary pulley 2 and secondary pulley 3 which are arranged such that V-groove of pulleys 2 and 3 are aligned with each other. V-belt 4 is engaged in the V-groove of pulleys 2 and 3 to thereby connect pulleys 2 and 3. Primary pulley 2 is coaxially disposed with engine 5 as a driving source. Lockup torque converter 6 and forward-reverse actuation mechanism 7 are disposed between engine 5 and primary pulley 2. Thus, CVT 1 is coupled to engine 5 via lockup torque converter 6 and forward-reverse actuation mechanism 7.

Forward-reverse actuation mechanism 7 includes double pinion planetary gearset 7a in which a sun gear is connected with engine 5 via torque converter 6, and a planet carrier is connected with primary pulley 2. Forward-reverse actuation mechanism 7 further includes forward clutch 7b directly connecting the sun gear and the planet carrier of planetary gearset 7a, and reverse brake 7c fixing a ring gear of planetary gearset 7a. Upon applying forward clutch 7b, the input rotation inputted from engine 5 via torque converter 6 is transmitted to primary pulley 2 in a forward direction. Upon applying reverse brake 7c, the input rotation inputted from engine 5 via torque converter 6 is transmitted to primary pulley 2 in a reverse direction and at a reduced speed.

The rotation transmitted to primary pulley 2 is transmitted to secondary pulley 3 via V-belt 4 and then transmitted to wheels, not shown, via output shaft 8, gearsets 9 and differential 10. Primary pulley 2 includes fixed disk 2a and moveable disk 2b arranged in coaxial and spaced relation to each other. Fixed disk 2a is fixed in the axial direction, and moveable disk 2b is moveable in the axial direction. Fixed and moveable disks 2a and 2b cooperate with each other to form the V-groove in which V-belt 4 is engaged. Moveable disk 2b is axially moved toward fixed disk 2a by supplying primary pulley pressure Ppri to primary pulley cylinder chamber 2c. Primary pulley pressure Ppri is produced based on line pressure PL as an initial pressure. Similar to primary pulley 2, secondary pulley 3 includes fixed disk 3a and moveable disk 3b arranged in coaxial and spaced relation to each other. Fixed and moveable disks 3a and 3b cooperate with each other to form the V-groove in which V-belt 4 is engaged. Moveable disk 3b is axially moved by supplying secondary pulley pressure Psec to secondary pulley cylinder chamber 3c. Secondary pulley pressure Psec is also produced from line pressure PL as an initial pressure. In this embodiment, a pressure-applying area of primary pulley cylinder chamber 2c and that of secondary pulley cylinder chamber 3c are set equal to each other. This avoids imbalance in diameter between primary pulley 2 and secondary pulley 3, serving for reducing the size of CVT 1. V-belt 4 is frictionally engaged with fixed and moveable disks 2a, 2b and 3a, 3b of primary and secondary pulleys 2 and 3 to thereby transmit the rotational force between primary and secondary pulleys 2 and 3.

Specifically, upon changing the gear ratio of CVT 1, moveable disks 2b and 3b of primary and secondary pulleys 2 and 3 are axially moved, respectively, to change a width of the V-groove. A radius of curvature of a circular arc formed by V-belt 4 contacted with pulleys 2 and 3 is continuously varied by changing the V-groove width. The change of the V-groove width is conducted by controlling primary pulley pressure Ppri and secondary pulley pressure Psec. A pulley speed ratio between the rotational speed of primary pulley 2 and the rotational speed of secondary pulley 3, namely, the gear ratio of CVT 1, can be thus changed. The change of the gear ratio to a target value can be realized by controlling primary pulley pressure Ppri and secondary pulley pressure Psec corresponding to the target gear ratio as explained later.

The outputs of primary pulley pressure Ppri and secondary pulley pressure Psec are controlled via shift control hydraulic circuit 11. Shift control hydraulic circuit 11 also controls output of a hydraulic pressure for applying forward clutch 7b upon shifting a selector lever to a forward range and output of a hydraulic pressure for applying rearward brake 7c upon shifting the selector lever to a rearward range. Shift control hydraulic circuit 11 is electronically connected to CVT controller 12 and conducts the hydraulic output controls in response to a control signal generated by CVT controller 12.

A plurality of sensors are electronically connected to CVT controller 12 and detect engine operating conditions. The sensors includes primary pulley speed sensor 13, secondary pulley speed sensor 14, secondary pulley pressure sensor 15, primary pulley pressure sensor 16, accelerator position sensor 17 and a hydraulic oil temperature sensor. Primary pulley speed sensor 13 detects the rotational speed of primary pulley 2 and generates signal Npri indicative of the detected primary pulley speed. Secondary pulley speed sensor 14 detects the rotational speed of secondary pulley 3 and generates signal Nsec indicative of the detected secondary pulley speed. Secondary pulley pressure sensor 15 detects the secondary pulley pressure supplied to secondary pulley cylinder chamber 3c and generates signal Psec indicative of the detected secondary pulley pressure. Primary pulley pressure sensor 16 detects the primary pulley pressure supplied to primary pulley cylinder chamber 2c and generates signal Ppri indicative of the detected primary pulley pressure. Accelerator position sensor 17 detects an opening degree of an accelerator and generates signal APO indicative of the detected accelerator opening degree. A hydraulic oil temperature sensor detects a temperature of the hydraulic oil in CVT 1 and generates signal TMP indicative of the detected hydraulic oil temperature. Inhibitor switch 18 is electronically connected to CVT controller 12 and detect a selector lever position in which a selector lever, now shown, is placed and generates signal SLP indicative of the detected selector lever position. Further, engine controller 19 is electronically connected with CVT controller 12. Engine controller 19 generates control signal ES for controlling engine 5 and a signal indicating information relative to CVT input torque. The signal indicating CVT input torque information includes engine speed signal Ne indicating an engine speed, and fuel injection time Tfi indicating a time for fuel injection. CVT controller 12 receives and processes these signals, and develops and transmits a control signal to shift control hydraulic circuit 11. CVT controller 12 may be a microcomputer including central processing unit (CPU), input and output ports (I/O), read-only memory (ROM), random access memory (RAM) and a common data bus.

Figure 2:
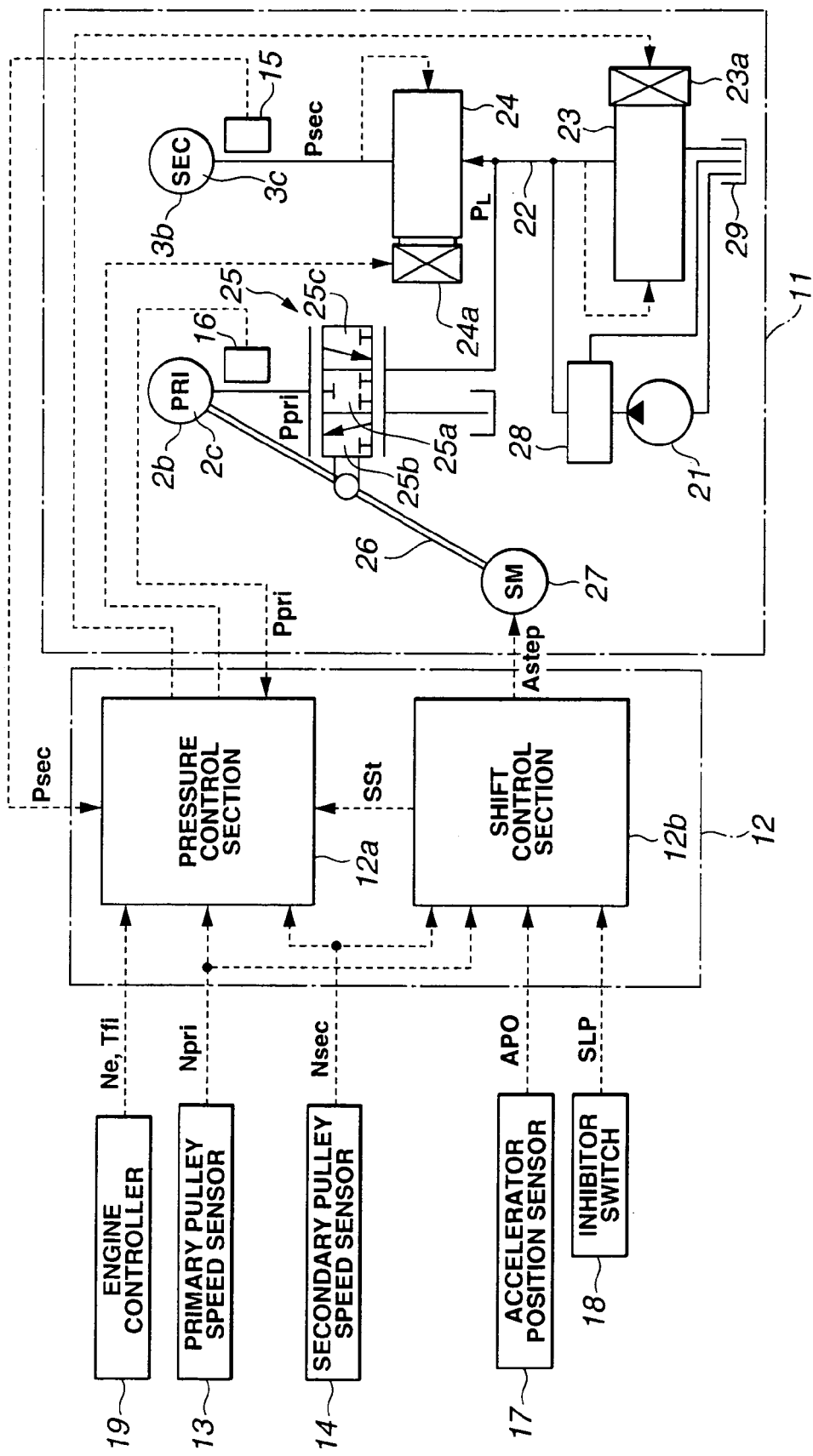
FIG. 2 is a block diagram of the control system of FIG. 1.

Referring to FIG. 2, shift control hydraulic circuit 11 and CVT controller 12 are explained in detail. As illustrated in FIG. 2, hydraulic circuit 11 includes oil pump 21 acting as a hydraulic pressure source. Oil pump 21 is driven by engine 5 shown in FIG. 1 and discharges a hydraulic oil pressure and a hydraulic oil amount into oil passage 22. Pressure regulator valve 23 having electrically operated solenoid 23a is disposed within oil passage 22. Pressure regulator valve 23 regulates the discharged hydraulic oil pressure at predetermined line pressure PL. Pressure reducing valve 24 is disposed within oil passage 22 downstream of pressure regulator valve 23. Pressure reducing valve 24 having electrically operated solenoid 24a regulates line pressure PL and supplies secondary pulley pressure Psec to secondary pulley cylinder chamber 3c. Shift control valve 25 is also disposed within oil passage 22 downstream of pressure regulator valve 23. Shift control valve 25 regulates line pressure PL and supplies primary pulley pressure Ppri to primary pulley cylinder chamber 2c.

Shift control valve 25 has neutral position 25a, pressure increasing position 25b and pressure reducing position 25c. Shift control valve 25 is coupled to a middle portion of shift control link 26 so as to shift between these three positions 25a, 25b and 25c. Stepping motor 27 acting as a shift control actuator is coupled to one end of shift control link 26. Moveable disk 2b of primary pulley 2 is coupled to an opposite end of shift control link 26. Stepping motor 27 has an operating position which advances from a reference position by the number of steps corresponding to a target gear ratio. When stepping motor 27 moves from the reference position to the operating position, shift control link 26 swings around the connection thereof with moveable disk 2b so that shift control valve 25 moves from neutral position 25a to pressure increasing position 25b or pressure reducing position 25c. When shift control valve 25 moves to pressure increasing position 25b, primary pulley pressure Ppri is increased based on line pressure PL. When shift control valve 25 moves to pressure reducing position 25c, primary pulley pressure Ppri is drained to be reduced. This causes change in differential pressure between primary pulley pressure Ppri and secondary pulley pressure Psec. Owing to the change in differential pressure, upshifts to a High side gear ratio and downshifts to a Low side gear ratio are performed. Thus, the shifting operation aiming at the target gear ratio is accomplished. The shifting operation is fed back to the opposite end of shift control link 26 to which moveable disk 2b of primary pulley 2 is coupled. Shift control link 26 swings around the connection thereof with stepping motor 27 in such a direction that shift control valve 25 moves from pressure increasing position 25b or pressure reducing position 25c to neutral position 25a. This allows shift control valve 25 to return to neutral position 25a when the target gear ratio is achieved. Thus, the target gear ratio can be maintained.

CVT controller 12 develops and transmits current signals for actuating solenoid 23a of pressure regulator valve 23 and solenoid 24a of pressure reducing valve 24, and control signal Astep indicating the number of steps for driving stepping motor 27 to the corresponding operating position. CVT controller 12 further develops and transmits a control signal for controlling supply of the hydraulic pressure for applying forward clutch 7b and rearward brake 7c as shown in FIG. 1. CVT controller 12 includes pressure control section 12a and shift control section 12b. Pressure control section 12a determines a solenoid current to be supplied to pressure regulator valve 23 and a solenoid current to be supplied to pressure reducing valve 24. Shift control section 12b determines step numbers Astep for driving stepping motor 27 in the following manner.

First, shift control section 12b determines a target input speed using a shift control map based on accelerator opening degree APO and vehicle speed Nv obtained from secondary pulley speed Nsec. Shift control section 12b calculates a target gear ratio corresponding to the vehicle operating conditions, namely, accelerator opening degree APO and vehicle speed Nv, by dividing the target input speed by secondary pulley speed Nsec. Next, shift control section 12b calculates an actual gear ratio, namely, a gear ratio to be reached, by dividing primary pulley speed Npri by secondary pulley speed Nsec. Shift control section 12b then determines a gear ratio command to approach the actual gear ratio to the target gear ratio at target shift speed SSt with compensating for a disturbance due to deviation of the actual gear ratio from target gear ratio. Shift control section 12b further determines step numbers Astep, namely, the operating position, of stepping motor 27 in accordance with the gear ratio command and transmits the shift control signal indicating step numbers Astep to stepping motor 27. In response to the shift control signal, stepping motor 27 is driven to move to the operating position for achieving the target gear ratio.

Flow rate control valve 28 is disposed on a discharge side of oil pump 21. Flow rate control valve 28 is so designed as to control the hydraulic oil amount discharged from oil pump 21 at substantially a constant rate when engine 5 is operated at a predetermined speed or more. It is preferred to use the flow rate control valve of the above-described related art.

Figure 3:
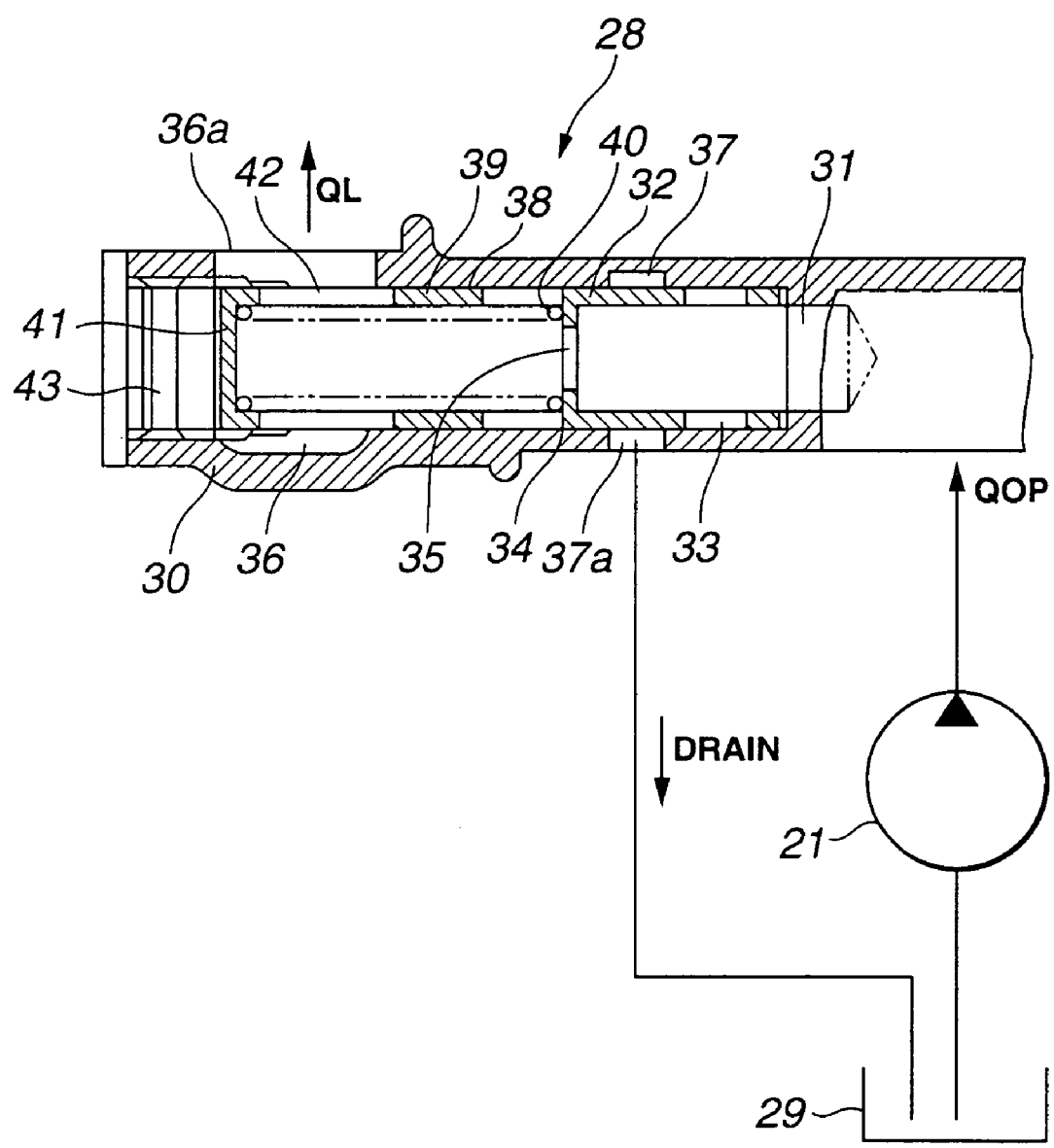
FIG. 3 is a flow rate control valve used in the hydraulic control system of the present invention.

FIG. 3 shows one example of flow rate control valve 28. As illustrated in FIG. 3, flow rate control valve 28 includes housing 30, valve bore 31 formed in housing 30, and hollow cylindrical spool 32 slidably moveable within valve bore 31. Spool 32 has a plurality of drain holes 33 circumferentially equidistantly spaced from each other. Spool 32 has end wall 34 formed with orifice 35 which has a predetermined diameter. Orifice 35 is located in a central portion of end wall 34. An upstream side of valve bore 31 is communicated with the discharge side of oil pump 21. A downstream side of valve bore 31 is communicated with oil passage 22 of shift control hydraulic circuit 11 via groove 36 and outlet port 36a of housing 30. Groove 36 is formed in a circumferential inner surface of housing 30. Outlet port 36a is in communication with groove 36 and open to a circumferential outer surface of housing 30. Housing 30 has groove 37 in the circumferential inner surface thereof and drain port 37a open to the circumferential outer surface thereof. Drain port 37a is communicated with groove 37 and oil pan 29. Drain holes 33 come into alignment with groove 37 and drain port 37*a* to thereby be fluidly communicated with oil pan 29, during the sliding movement of spool 32. Each of drain holes 33 has a communication area which is fluidly communicated with groove 37 and drain port 37*a* and varied with the sliding movement of spool 32. Spool 32 has operating positions including a rest position shown in FIG. 3, a large stroke position where the communication area of drain hole 33 is not less than a first predetermined area, and a small stroke position where the communication area thereof is not more than a second predetermined area. The first predetermined area is the communication area which is fluidly communicated with drain port 37*a* when engine speed Ne is first speed Ne1, namely, 4500 rpm in this embodiment. The second predetermined area is the communication area which is fluidly communicated with drain port 37*a* when engine speed Ne is second speed Ne2, namely, 2000 rpm in this embodiment. Spool 32 is displaceable between these operating positions by a differential pressure between upstream and downstream sides of orifice 35 as explained later.

Hollow cylindrical stop 38 for limiting the sliding movement of spool 32 is fitted into valve bore 31 downstream of spool 32. Stop 38 has circumferential wall 39 and end wall 41 cooperating to enclose spring 40 which biases spool 32 toward the upstream side of valve bore 31. Circumferential wall 39 has a plurality of openings 42 which are circumferentially equidistantly spaced from each other on the side of end wall 41. Each of openings 42 has a width substantially same as that of groove 36 of housing 30. Stop 38 is held in place by contacting plug 43 which closes one end of housing 30.

Flow rate control valve 28 is operative to control a flow rate of the hydraulic oil amount passing through orifice 35 by regulating the hydraulic oil amount drained from the communication area of drain holes 33 depending on the displacement of spool 32. The operation of flow rate control valve 28 will be explained hereinafter. As the hydraulic oil amount discharged from oil pump 21 to valve bore 31 increases, the differential pressure between the upstream and downstream sides of orifice 35 increases. Owing to the increase in the differential pressure, spool 32 is displaced toward stop 38 against the biasing force of spring 40. Drain holes 33 of spool 32 are brought into alignment with groove 37 of housing 30 to thereby be communicated therewith. A predetermined amount of the hydraulic oil flowing into valve bore 31 passes through orifice 35 and flows toward the downstream side of flow rate control valve 28 via an inside bore of circumferential wall 39, openings 42 of stop 38, groove 36 and outlet port 36*a* of housing 30. A part of the hydraulic oil amount is drained from valve bore 31 via drain holes 33, groove 37 and drain port 37*a* and returned to oil pan 29. When the hydraulic oil amount discharged from oil pump 21 to valve bore 31 increases to maximize the communication area of drain hole 33, spool 32 is in contact with stop 38 to thereby be prevented from the displacement toward the downstream side of valve bore 31.

On the other hand, when the hydraulic oil amount discharged from oil pump 21 to valve bore 31 decreases, the differential pressure between the upstream and downstream sides of orifice 35 is reduced. In response to the reduction of the differential pressure, spool 32 is urged by the biasing force of spring 40 to return toward the upstream side of valve bore 31. Drain holes 33 are brought into non-alignment with groove 37 so that the communication area of drain holes 33 is decreased.

Thus, owing to the displacement of spool 32 in response to the differential pressure between the upstream and downstream sides of orifice 35, flow rate control valve 28 performs control of the flow rate of the hydraulic oil amount flowing therethrough. However, there will occur a failure of the displacement of spool 32 due to friction caused between parts of flow rate control valve 28, for instance, housing 30 and spool 32. If spool 32 is prevented from sufficiently returning when the hydraulic oil amount discharged from oil pump 21 to valve bore 31 is reduced, the communication area of drain holes 33 will not be decreased. This will occur in a case where the hydraulic oil amount discharged from oil pump 21 to valve bore 31 is reduced for a relatively short period of time. In the case of failure of sufficient returning of spool 32, the hydraulic oil amount drained from drain port 37*a* via drain holes 33 becomes larger than that flowing from outlet port 36*a* into oil passage 22 downstream of shift control hydraulic circuit 11. This will cause decrease in the hydraulic oil amount supplied to oil passage 22 and thereby occur undesired influence on an operating performance of CVT 1.

Figure 4:
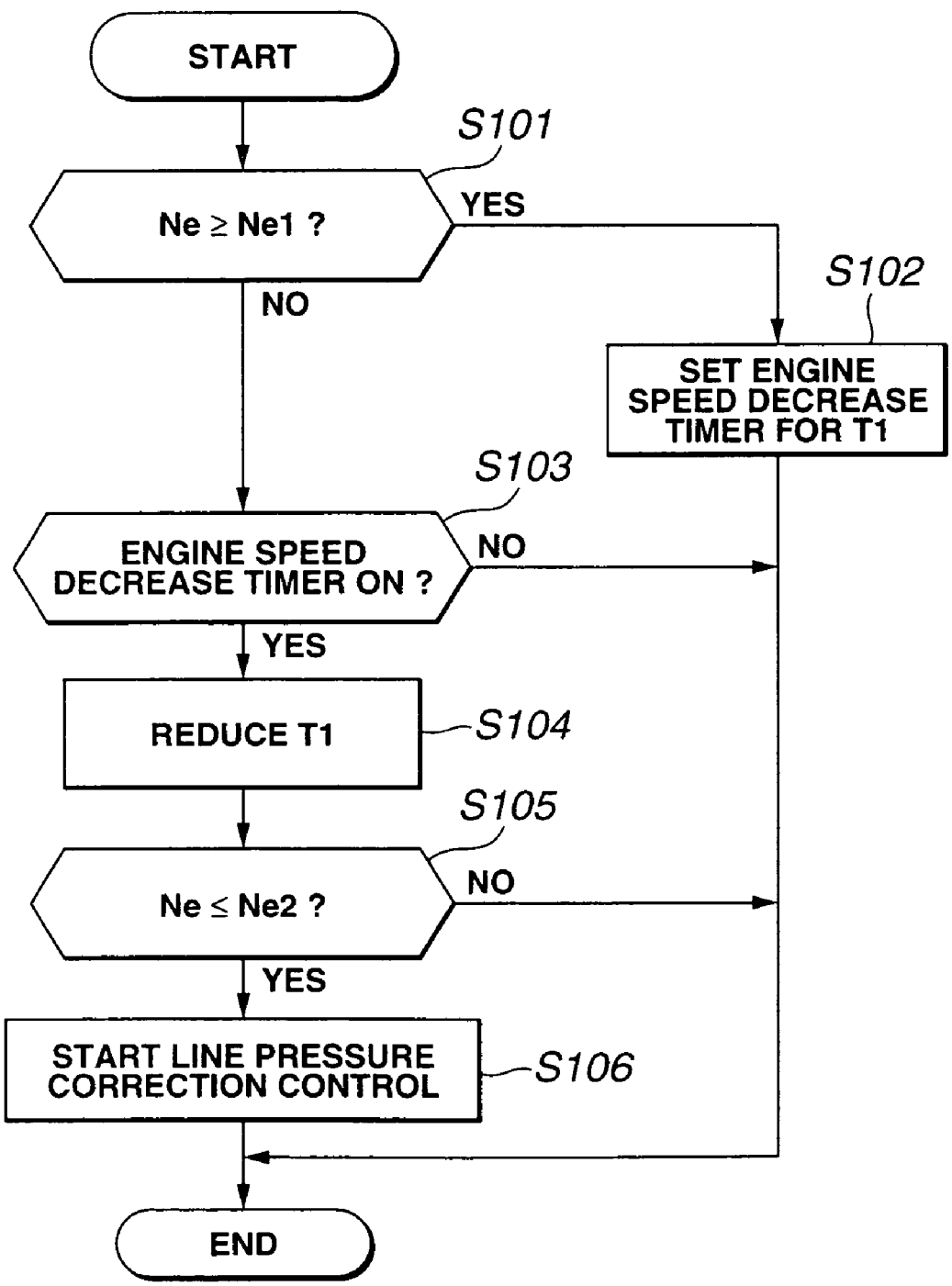
FIG. 4 is a flow chart of a routine of a line pressure correction control executed in the hydraulic control system of the present invention.
Figure 5:
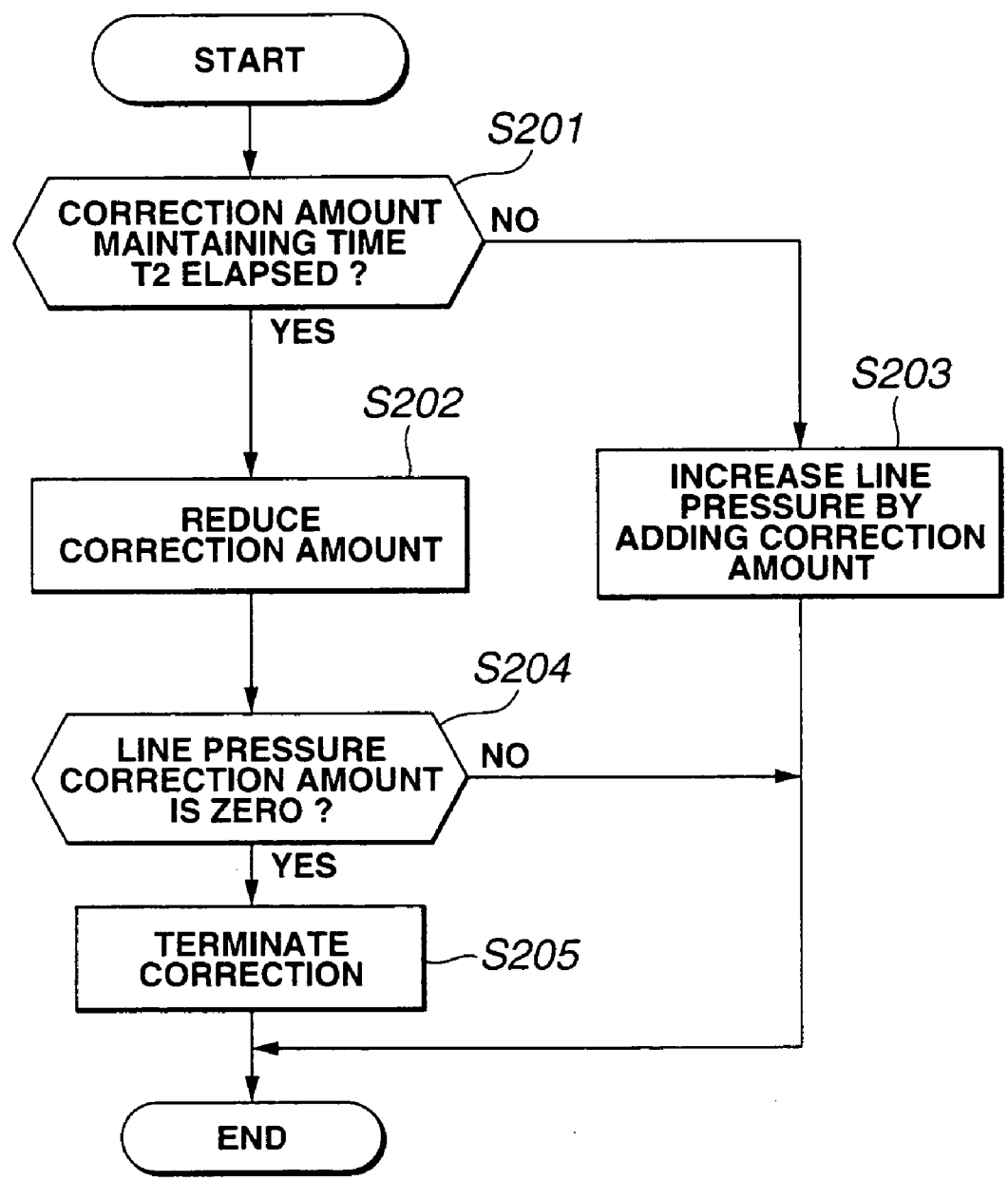
FIG. 5 is a flow chart of a subroutine of the line pressure correction control shown in FIG. 4.

In order to avoid the undesired influence on the CVT operating performance, the hydraulic control system or method of the present invention conducts correction control relative to the hydraulic oil pressure, i.e., line pressure PL, to be supplied to the downstream side of flow rate control valve 28. FIGS. 4 and 5 illustrate a control logic of the line pressure correction. FIG. 4 shows the entire routine, and FIG. 5 shows a subroutine of increasing line pressure PL. The control logic is periodically and repeatedly executed by pressure control section 12*a* of CVT controller 12.

Referring now to FIG. 4, logic flow starts and goes to block S101 where it is determined whether engine speed Ne detected is relatively high. Namely, at block S101, a determination as to whether engine speed Ne detected is not less than first speed Ne1 is made. In this embodiment, first speed Ne1 is set at 4500 rpm. When the answer to block S101 is yes, the logic flow proceeds to block S102. At block S102, an engine speed decrease timer is set for counting down predetermined time T1. The engine speed decrease timer is so designed as to start the countdown of predetermined time T1 following a standby period. Engine speed Ne becomes not less than first speed Ne1 and then decreases to reach first speed Ne1 again for the standby period. Predetermined time T1 is set in several seconds in this embodiment. Then, the logic flow jumps to end. When the answer to block S101 is no, the logic flow proceeds to block S103. At block S103, a determination as to whether the engine speed decrease timer is ON is made. When the answer to block S103 is yes, indicating that the engine speed decrease timer is active in countdown, the logic flow proceeds to block S104. At block S104, predetermined time T1 is reduced. Namely, in order to set predetermined time T1 smaller as engine speed Ne decreases, predetermined time T1 is reduced every period the control routine is executed. The logic flow proceeds to block S105 where it is determined whether engine speed Ne detected is relatively low. Namely, at block S105, a determination as to whether engine speed Ne detected is not more than second predetermined engine speed Ne2 is made. When the answer to block S105 is yes, indicating that engine speed Ne is changed to a low speed within predetermined time T1, the logic flow proceeds to block S106. At block S106, the line pressure correction control is executed. The logic flow then goes to end. When the answer to block S103 is no, the logic flow jumps to end. When the answer to block S105 is no, the logic flow jumps to end.

Referring to FIG. 5, the line pressure correction control executed at block S106 of FIG. 4 is explained. Logic flow starts and goes to block S201 where a determination as to whether predetermined time T2 sufficient to maintain a correction amount of hydraulic pressure for increasing line pressure PL is elapsed is made. Specifically, predetermined time T2 means a time required for maintaining a hydraulic pressure sufficient to displace spool 32 of flow rate control valve 28 to a proper stroke position when line pressure PL is corrected to increase. In this embodiment, predetermined time T2 is 1.0 sec. The correction amount of hydraulic pressure which is used to increase line pressure PL is maintained constant over predetermined time T2. In the determination at block S201, a correction amount holding timer for counting predetermined time T2 is used. When answer to block S201 is no, the logic flow proceeds to block S203 where line pressure PL is corrected to increase by adding a predetermined correction amount of hydraulic pressure. Specifically, a desired line pressure necessary at a current state is calculated based on various parameters, for example, a target gear ratio and an input torque, of vehicle operating conditions. The desired line pressure is corrected to increase by adding the predetermined correction amount of hydraulic pressure thereto. The predetermined correction amount is, for instance, 1 MPa. The logic flow then jumps to end.

When the answer to block S201 is yes, the logic flow proceeds to block S202 where the correction amount of hydraulic pressure is reduced. Namely, the correction amount of hydraulic pressure is decreased every period the control routine is executed. Specifically, a desired line pressure necessary at a current state is calculated as explained at block S203. Then, the line pressure increased in the previous period of the correction execution is reduced using a predetermined gain so as to reach the desired line pressure calculated. The logic flow then proceeds to block S204. At block S204, a determination as to whether the correction amount of hydraulic pressure becomes zero is made. When the answer to block S204 is yes, the logic flow proceeds to block S205. At block S205, the execution of the line pressure increasing correction control at the current period is terminated, for instance, by clearing a control execution flag. Then, the logic flow goes to end. When the answer to block S204 is no, the logic flow jumps to end.

Figure 6:
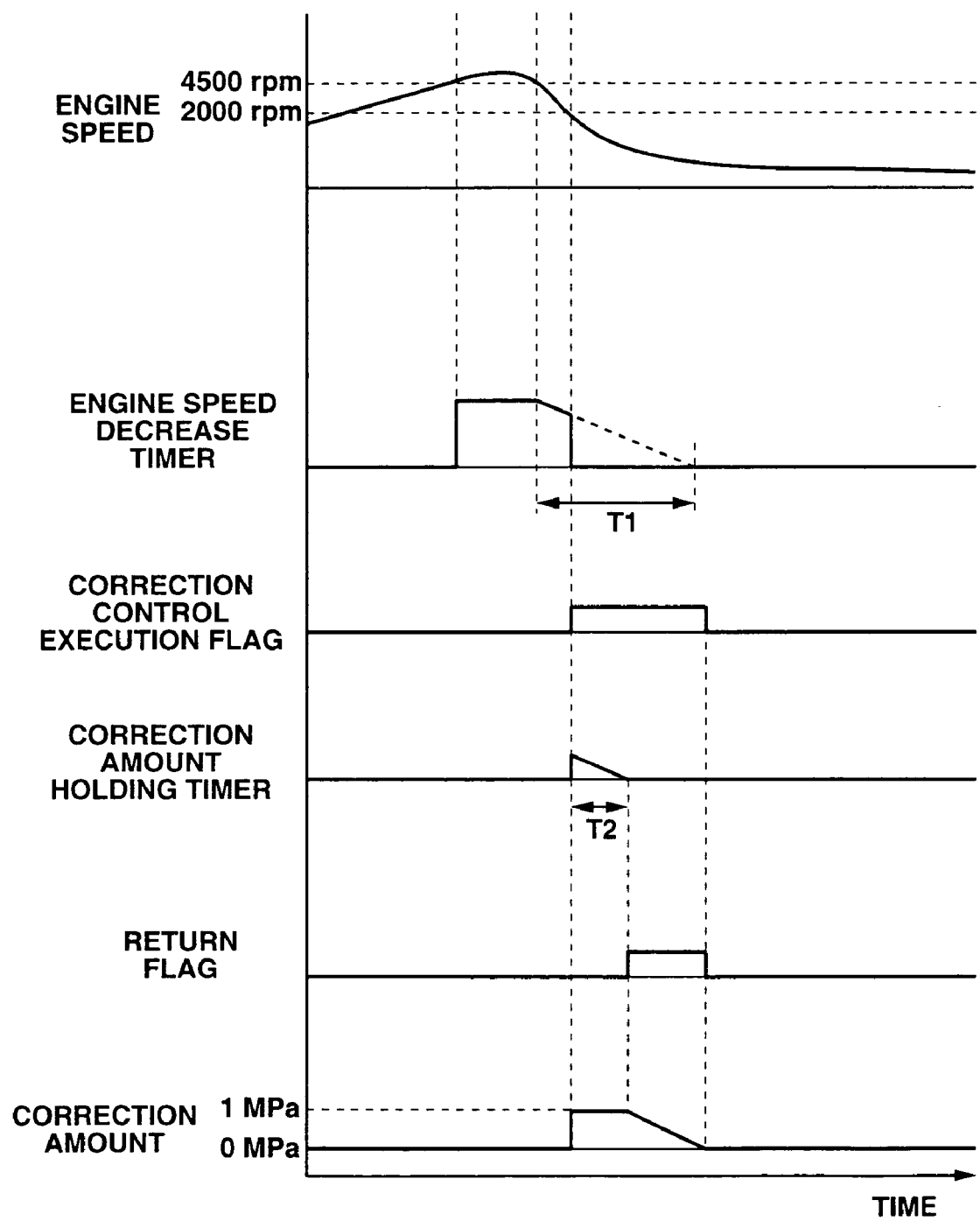
FIG. 6 is a timing chart showing engine speed, engine speed decrease timer, correction control execution flag, correction amount holding timer, return flag and correction amount.

FIG. 6 is a timing chart showing the process of the line pressure control shown in FIGS. 4 and 5. As time elapses, engine speed Ne becomes higher than first speed Ne1, i.e., 4500 rpm, and then decreases to be lower than second speed Ne2, i.e., 2000 rpm. After that, engine speed Ne becomes substantially constant.

As explained above, if spool 32 of flow rate control valve 28 is prevented from returning from the large stroke position to the small stroke position due to friction or other factors, there will occur lack of the hydraulic oil to be supplied from flow rate control valve 28 to oil passage 22 of shift control hydraulic circuit 11. In other words, when engine speed Ne is changed from high speed to low speed, the returning movement of spool 32 is prevented. Accordingly, in the hydraulic control system or method of the present invention, line pressure PL is corrected to increase so that spool 32 is urged to return to the small stroke position. This can avoid the lack of the hydraulic oil supplied from flow rate control valve 28 to oil passage 22. Actually, it is not easy to detect the displacement amount of spool 32, namely, the stroke position thereof. Therefore, in the hydraulic control system or method of the present invention, the stroke position of spool 32 is determined based on engine speed Ne.

The engine speed decrease timer is set when engine speed Ne reaches first speed Ne1, i.e., 4500 rpm. The engine speed decrease timer starts the countdown of predetermined time T1, i.e., several seconds, following the standby period. The standby period is from the moment at which engine speed Ne reaches first speed Ne1 to the moment at which engine speed Ne reaches first speed Ne1 again subsequent to decreasing from a speed higher than first speed Ne1. The engine speed decrease timer has a preset value and maintains the preset value for the standby period. The engine speed decrease timer continues the countdown to zero for predetermined time T1. Meanwhile, when engine speed Ne is slowly changed, spool 32 of flow rate control valve 28 can return to the proper stroke position. Therefore, the line pressure correction control is conducted only when engine speed Ne is changed from first speed Ne1 to second speed Ne2 within predetermined time T1.

When engine speed Ne further decreases to second speed Ne2, i.e., 2000 rpm, the line pressure increasing correction control is started. At this time, a correction control execution flag is set ON, indicating that the line pressure increasing correction control is executed. Meanwhile, in order to avoid repeated execution of the line pressure increasing correction control when engine speed Ne fluctuates near second speed Ne2, the preset value of the engine speed decrease timer is reset to zero upon starting the line pressure increasing correction control.

At the moment at which the line pressure increasing correction control is started, the correction amount holding timer is started. The correction amount holding timer is so designed as to be at the ON state over predetermined time T2 for ensuring the hydraulic pressure sufficient to displace spool 32 of flow rate control valve 28 to the proper stroke position in response to the increased line pressure. The predetermined correction amount of hydraulic pressure for increasing line pressure PL is maintained constant over predetermined time T2.

At the moment at which the correction amount holding timer is turned off, a return flag is set ON. The return flag is kept at the ON state until the increased line pressure decreases to the previous value to which the correction amount is added.

The predetermined correction amount of hydraulic pressure is added to line pressure PL from the moment at which the correction control execution flag is set ON. The predetermined correction amount is a hydraulic pressure amount which is required for displacing spool 32 of flow rate control valve 28 to the proper stroke position and set in such a range as to cause no influence on vehicle driving conditions. In this embodiment, the predetermined correction amount is set at 1 MPa. The predetermined correction amount is kept constant over the time T2 in which the correction amount holding timer is at the ON state, and is reduced at a constant rate from the moment at which the correction amount holding timer is turned OFF. Namely, the predetermined correction amount is kept constant over predetermined time T2 and is reduced at the constant rate from the moment at which the return flag is set ON. The correction control execution flag and the return flag are turned OFF at the moment at which the predetermined correction amount becomes zero. The line pressure correction control is then finished.

Figure 7:
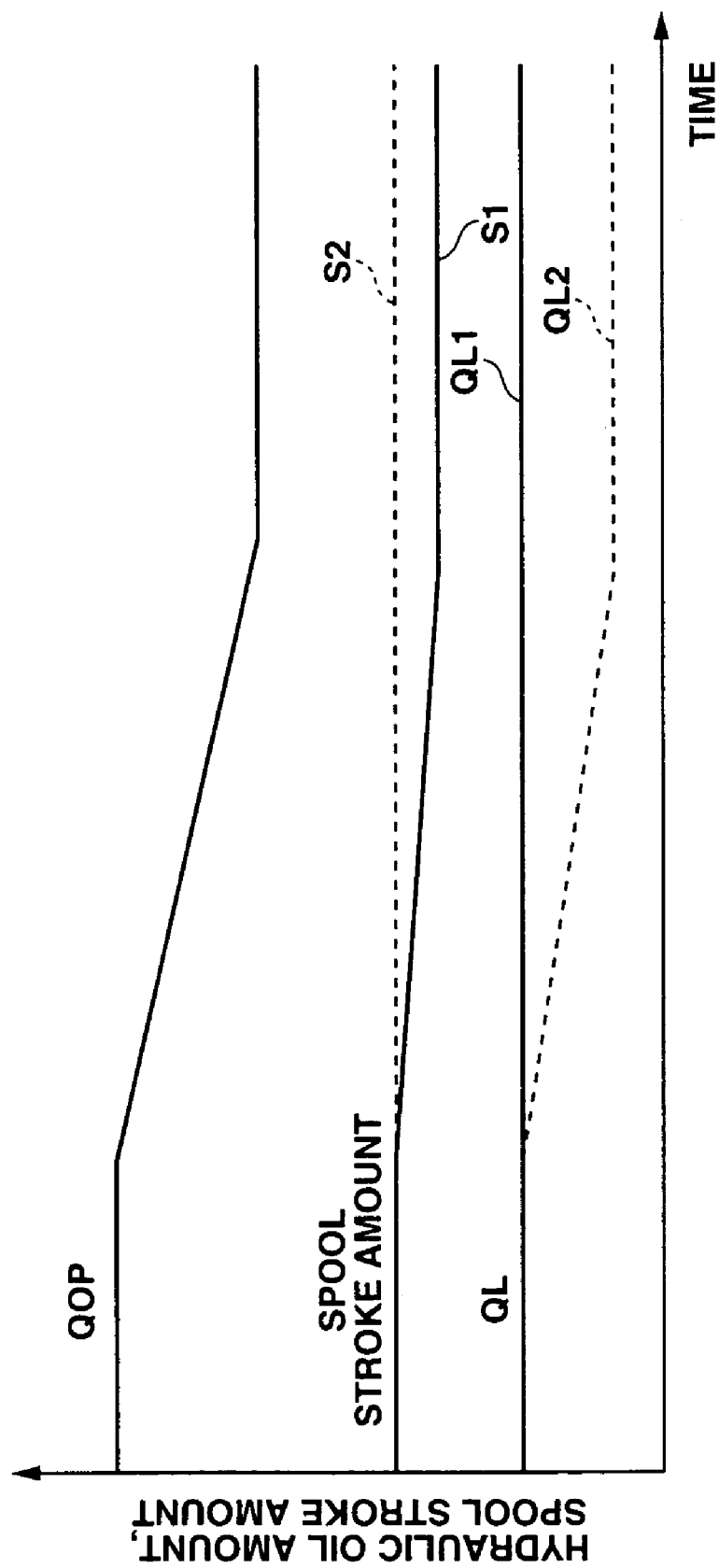
FIG. 7 is a graph showing changes in a hydraulic oil amount flowing in and out of the flow rate control valve and a stroke amount of a spool of the flow rate control valve with time, which exhibit conditions when the line pressure correction control is conducted and when the line pressure correction control is not conducted.

FIG. 7 illustrates change in hydraulic oil amount QOP flowing from oil pump 21 into flow rate control valve 28, hydraulic oil amount QL flowing from flow rate control valve 28 to the downstream side thereof, and an amount of stroke of spool 32, with the elapse of time. Hydraulic oil amount QL obtained when the line pressure correction control of the present invention is executed is indicated by solid line QL1, and hydraulic oil amount QL obtained when the line pressure correction control of the present invention is not executed is indicated by broken line QL2. The spool stroke amount obtained when the line pressure correction control of the present invention is executed is indicated by solid line S1, and the spool stroke amount obtained when the line pressure correction control of the present invention is not executed is indicated by broken line S2. The change in the spool stroke amount is indicated corresponding to the displacement of spool 32 from the large stroke position toward the rest position shown on the right side of FIG. 3.

When engine speed Ne decreases, hydraulic oil amount QOP flowing into flow rate control valve 28 is reduced with time. In this state, if spool 32 is prevented from returning toward the rest position due to defects such as occurrence of friction and the line pressure correction control is not executed, there will no change in the spool stroke amount as indicated by broken line S2. In this condition, the hydraulic oil amount flowing from flow rate control valve 28 to the drain side through the communication area of drain holes 33 is not decreased. This results in reduction of hydraulic oil amount QL flowing from flow rate control valve 28 to the downstream side as indicated by broken line QL2. In contrast, under the same condition, when the line pressure correction control is executed, the differential pressure between the upstream and downstream sides of orifice 35 is caused so as to return spool 32 toward the rest position. At this time, the spool stroke amount is reduced as indicated by solid line S1, and the hydraulic oil amount flowing from flow rate control valve 28 to the drain side is decreased. Hydraulic oil amount QL flowing from flow rate control valve 28 to the downstream side is maintained constant as indicated by broken line QL1. As a result, a sufficient hydraulic oil amount can be supplied within hydraulic circuit 11 for the shift control operation of CVT 1. This can avoid deterioration of an operating performance of CVT 1 which is caused due to lack of the hydraulic oil amount to be supplied.

Figure 8:
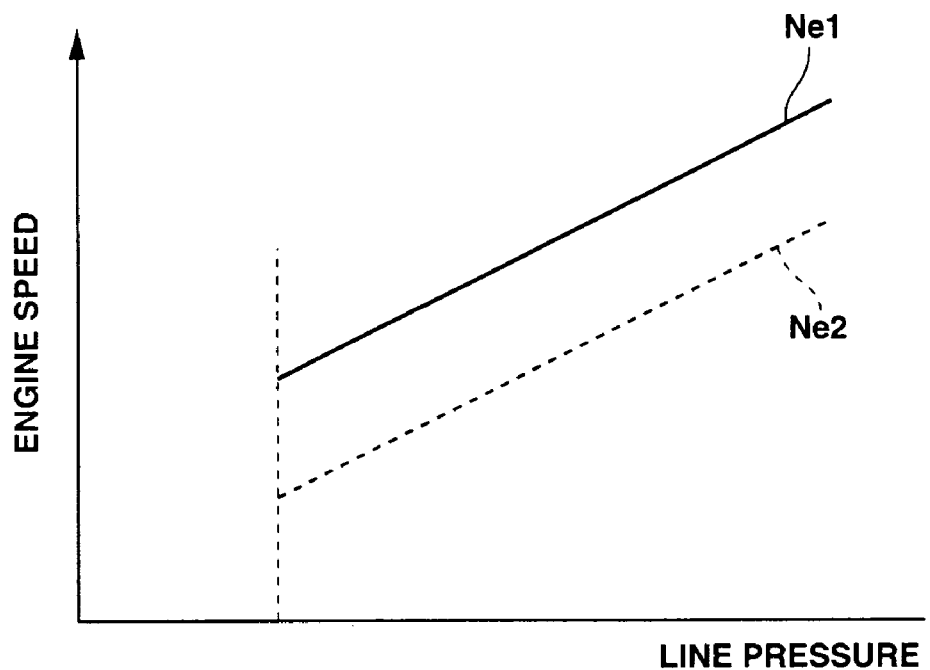
FIG. 8 is a graph showing a relationship between engine speeds Ne1 and Ne2 and line pressure according to a second embodiment of the present invention.

Referring to FIG. 8, a second embodiment of the hydraulic control system and method of the present invention is explained. The second embodiment differs in that first and second speeds Ne1 and Ne2 of engine speed Ne are varied depending on change of line pressure PL, from the first embodiment in which first and second speeds Ne1 and Ne2 have the constant values, i.e., 4500 rpm and 2000 rpm. In the second embodiment, a graph shown in FIG. 8 is used. As illustrated in FIG. 8, as line pressure PL increases, the values of first and second speeds Ne1 and Ne2 are set larger. If the hydraulic oil pressure downstream of orifice 35 of flow rate control valve 28, i.e., line pressure PL, is high and engine speed Ne is not high, a difference between line pressure PL and the hydraulic oil pressure upstream of orifice 35 will become small to thereby cause a small stroke amount of spool 32. Therefore, by varying the values of first and second speeds Ne1 and Ne2 as references of determining the stroke positions of spool 32 based on line pressure PL, the spool stroke positions can be certainly determined so that the line pressure correction control can be better conducted.

Figure 9:
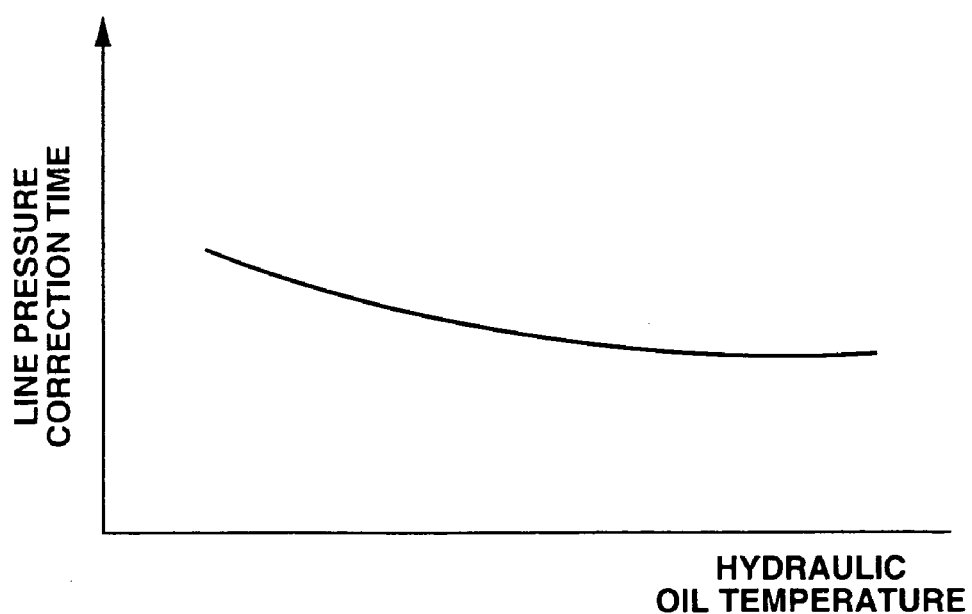
FIG. 9 is a graph showing a relationship between hydraulic oil temperature and line pressure correction time according to a third embodiment of the present invention.

Referring to FIG. 9, a third embodiment of the hydraulic control system and method of the present invention is explained. In the third embodiment, a line pressure correction time over which the line pressure increasing correction control is executed is varied based on a hydraulic oil temperature. Namely, as illustrated in FIG. 9, as the hydraulic oil temperature decreases, the line pressure correction time is set longer. Specifically, viscosity of the hydraulic oil varies depending on temperature of the hydraulic oil, whereby the displacement of spool 32 of flow rate control valve 28 is influenced by the hydraulic oil temperature. Therefore, as the hydraulic oil temperature becomes lower, the line pressure correction time is set longer. This can more suitably and certainly implement the line pressure increasing correction control.

Figure 10:
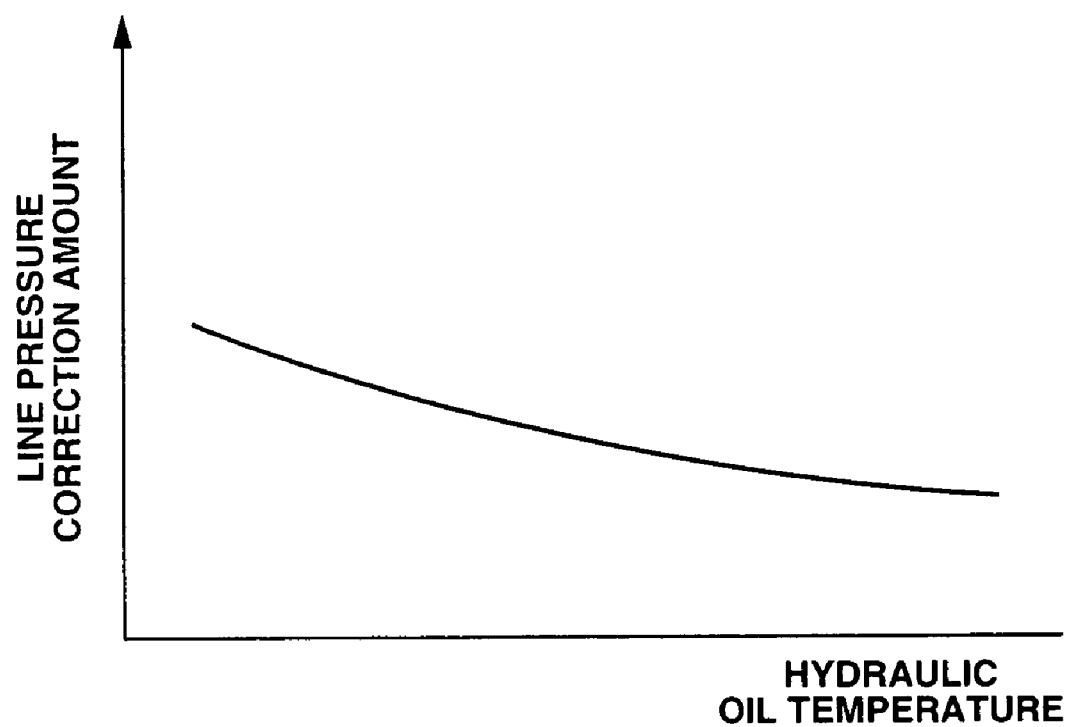
FIG. 10 is a graph showing a relationship between hydraulic oil temperature and line pressure correction amount according to a fourth embodiment of the present invention.

Referring to FIG. 10, a fourth embodiment of the hydraulic control system and method of the present invention is explained. In the fourth embodiment, the line pressure correction amount used for increasing line pressure PL is varied based on a hydraulic oil temperature. Namely, as illustrated in FIG. 10, as the hydraulic oil temperature decreases, the line pressure correction amount is set larger. As explained in the third embodiment, the displacement of spool 32 of flow rate control valve 28 is influenced by the hydraulic oil temperature. Therefore, as the hydraulic oil temperature becomes lower, the line pressure correction amount is set larger. This allows more suitable and certain implementation of the line pressure increasing correction control.

As is understood from the above description, in the hydraulic control system and method of the present invention, the differential pressure between the upstream and downstream sides of orifice 35 of flow rate control valve 28 can be increased so that the displacement of spool 32 from the large stroke position to the small stroke position can be certainly performed. Owing to the displacement of spool 32 to the small stroke position, the hydraulic oil amount to be drained from flow rate control valve 28 via the communication area of drain holes 33 can be reduced. This can prevent decrease of the hydraulic oil amount to be supplied to the downstream side of flow rate control valve 28 and, therefore, can effectively avoid lack of the hydraulic oil amount on the downstream side of flow rate control valve 28. This serves for suppressing deterioration of the operating performance of CVT 1.

Further, since the spool stroke position is determined based on engine speed Ne, sensors for detecting the spool stroke position can be omitted. This serves for saving the production cost of the hydraulic control system and preventing the number of parts.

This application is based on a prior Japanese Patent Application No. 2002-350027 filed on Dec. 2, 2002. The entire contents of the Japanese Patent Application No. 2002-350027 is hereby incorporated by reference.

Although the present invention has been described above by reference to certain embodiments of the invention, the present invention is not limited to the embodiments described above and can be applied to automatic transmissions other than CVTs. Modifications and variations of the embodiments described above will occur to those skilled in the art in light of the above teachings. The scope of the invention is defined with reference to the following claims.

What is claimed is:

1. A hydraulic control system for an automatic transmission, comprising:
   a hydraulic pressure source operative to discharge a hydraulic oil amount;
   a flow rate control valve disposed on a discharge side of the hydraulic pressure source, the flow rate control valve including a displaceable spool formed with an orifice and a drain hole, the drain hole having a communication area which is fluidly communicated with an outside of the flow rate control valve and varied during displacement of the spool, the spool having a large stroke position where the communication area is not less than a first predetermined area, and a small stroke position where the communication area is not more than a second predetermined area, the flow rate control valve being operative to control a flow rate of the hydraulic oil amount passing through the orifice by regulating the hydraulic oil amount drained from the communication area depending on displacement of the spool;

stroke position determining means for determining that the spool is displaced from the large stroke position to the small stroke position; and pressure regulator means for regulating a hydraulic oil pressure downstream of the orifice, the pressure regulator means correcting the hydraulic oil pressure downstream of the orifice by adding a predetermined correction amount of hydraulic pressure for a first predetermined time when the stroke position determining means determines that the spool is displaced from the large stroke position to the small stroke position.

2. The hydraulic control system as claimed in claim 1, further comprising a driving source coupled to the hydraulic pressure source and rotatable to drive the hydraulic pressure source, the first predetermined area being a communication area of the drain hole which is communicated with the outside of the flow rate control valve when the rotational speed of the driving source is a first speed, the second predetermined area being a communication area of the drain hole which is communicated with the outside of the flow rate control valve when the rotational speed of the driving source is a second speed.

3. The hydraulic control system as claimed in claim 1, further comprising a driving source coupled to the hydraulic pressure source and rotatable to drive the hydraulic pressure source, the stroke position determining means determining that the spool is displaced from the large stroke position to the small stroke position when a rotational speed of the driving source is decreased from a first speed to a second speed for a second predetermined time.

4. The hydraulic control system as claimed in claim 3, wherein the first speed is set higher as the hydraulic pressure downstream of the orifice increases.

5. The hydraulic control system as claimed in claim 3, wherein the second speed is set higher as the hydraulic pressure downstream of the orifice increases.

6. The hydraulic control system as claimed in claim 1, wherein the first predetermined time is set longer as a temperature of the hydraulic oil decreases.

7. The hydraulic control system as claimed in claim 1, wherein the predetermined correction amount is set larger as a temperature of the hydraulic oil decreases.

8. A method for hydraulically controlling an automatic transmission supplied with a hydraulic oil amount discharged by a hydraulic pressure source driven by a driving source, the hydraulic oil amount discharged being controlled by a flow rate control valve including a displaceable spool with an orifice, the method comprising:
determining whether a driving source speed is not less than a first speed;
determining whether the driving source speed is not more than a second speed;
determining whether a first predetermined time has elapsed when it is determined that the driving source speed is less than the first speed and that the driving source speed is not more than the second speed; and
correcting a hydraulic oil pressure downstream of the orifice of the flow rate control valve by adding a predetermined correction amount of hydraulic pressure when it is determined that the first predetermined time has not elapsed.

9. The method as claimed in claim 8, further comprising reducing the predetermined correction amount when it is determined that the first predetermined time has elapsed.

10. The method as claimed in claim 9, further comprising determining whether the predetermined correction amount is zero.

11. The method as claimed in claim 10, wherein the correcting operation is terminated when it is determined that the predetermined correction amount is zero.

12. The method as claimed in claim 8, further comprising counting a second predetermined time when it is determined that the driving source speed is not less than the first speed.

13. The method as claimed in claim 12, further comprising reducing the second predetermined time as the driving source speed decreases when it is determined that the driving source speed is less than the first speed.

14. The method as claimed in claim 12, wherein the counting operation of a second predetermined time is started following a standby period for which the driving source speed becomes not less than the first speed and decreases to reach the first speed again.

15. The method as claimed in claim 8, wherein the first speed is set higher as the hydraulic pressure downstream of the orifice increases.

16. The method as claimed in claim 8, wherein the second speed is set higher as the hydraulic pressure downstream of the orifice increases.

17. The method as claimed in claim 8, wherein the second predetermined time is set longer as a temperature of the hydraulic oil decreases.

18. The method as claimed in claim 8, wherein the predetermined correction amount is set larger as a temperature of the hydraulic oil decreases.

* * * * *